Nov. 2, 1965  C. G. B. GARRETT  3,215,949
OPTICAL MASER USING INTERNAL REFLECTION
Filed Oct. 25, 1960  2 Sheets-Sheet 1

INVENTOR
C. G. B. GARRETT
BY
*George S. Indy*
ATTORNEY

Nov. 2, 1965 C. G. B. GARRETT 3,215,949
OPTICAL MASER USING INTERNAL REFLECTION
Filed Oct. 25, 1960 2 Sheets-Sheet 2

INVENTOR
C. G. B. GARRETT
BY
ATTORNEY

United States Patent Office 3,215,949
Patented Nov. 2, 1965

3,215,949
OPTICAL MASER USING INTERNAL REFLECTION
Charles G. B. Garrett, Morristown, N.J., assignor to Bell Telephone Laboratories, Incorporated, New York, N.Y., a corporation of New York
Filed Oct. 25, 1960, Ser. No. 64,879
10 Claims. (Cl. 331—94.5)

This invention relates to an apparatus for producing coherent electromagnetic radiation in the light energy frequencies. More specifically, it relates to cavity designs which are adapted to support light radiation of a particular frequency in one preferred standing wave oscillation. This standing wave pattern is, according to a preferred embodiment, amplified by maser action thus producing coherent radiation which, when emitted from the cavity, may then be modulated, amplified and transmitted as an intelligence signal.

Light energy radiation defines the electromagnetic band from ultraviolet to the farthest infrared. This encompasses a general wavelength range of from 100 Angstroms to $2 \cdot 10^6$ Angstroms.

The cavities according to this invention find use as frequency selectors and also serve much the same functions as microwave cavities which are known in the art. Other applications of these cavities will be apparent to those skilled in the art.

Of particular current interest are cavities adapted to support maser materials and to function as maser generators or amplifiers. It has recently been considered practical and in many ways desirable to extend communication signal carriers into radiation of the light frequency range. Many of the well-known advantages through which microwave communication has found favor apply in greater measure to light frequency intelligence.

A primary obstacle to the advance of optical or light frequency communications is the production of coherent light radiation upon which an intelligence signal can be imposed. For various reasons, the philosophy of design of known devices for producing coherent electromagnetic radiation (such as resonant cavity structures for producing coherent microwave radiation) is not easily extended to radiation of light frequencies. One of the more obvious reasons is that such cavities typically have dimensions commensurate with the wavelength of the radiation they support, however, a cavity having dimensions approximating light wavelengths is, by present standards, considered impractical to produce.

The present invention proposes a device for producing coherent light radiation. It consists of a cavity in the form of a crystal having peculiar characteristics which allow for the support of a coherently oscillating standing wave pattern. The crystal is designed in a manner such that total internal reflection and continuous entrapment of light within the crystal will inhere. This requires a specific crystal geometry and an attendant critical relationship between the refractive indices of the crystal and the surrounding medium. If light radiation of a single frequency, i.e., monochromatic light, is obtained in a crystal, of the proper design, a portion of this light experiences total internal reflection. This allows the radiation to assume a standing wave pattern in a mode preferred by the cavity. The radiation is thereby retained in the cavity for a period sufficient that other influences may be introduced into the wave pattern such as modulation and coherent amplification. This cavity is particularly adapted to the generation of coherent radiation utilizing stimulated emission, commonly termed maser action. The application of the invention to this particular embodiment will be considered hereinafter. Whereas the light is spoken of as being entrapped by total internal reflections, it is obvious that the light must be emitted from the crystal to be of any use. Practically speaking the light will, after many reflections, leak from the crystal through edges and corners. If a more directional emission is desired, an edge or a corner may be beveled or an imperfection in the form of an indentation or protrusion may be introduced on a face of the crystal.

The particular geometric solids which will essentially permanently entrap light are spheres, regular perpendicular cylinders and prisms, i.e., solids having two directly opposed parallel and congruent sides of regular polygonal shape such that all sides meet these surfaces at angles of 90°.

It is characteristic of the shapes which include a round surface, i.e., cylinders and spheres, that some internal entrapment occurs whenever the index of refraction of the crystal exceeds that of the surrounding medium. The degree or amount of entrapment in these cases is proportional to the ratio of the indices of refraction. In the prismatic geometries, however, a minimum critical relation between the indices of refraction must be achieved before any entrapment of light occurs. The phenomenon of entrapped light and the relation of degrees of entrapment to the solid geometries and the refractive indices are perhaps better understood in view of the drawing in which:

It should first be appreciated that this discussion considers only light which originates inside the crystal. It will become apparent upon examination of the principles of refraction that light theoretically cannot be introduced into the crystal from an exterior source and be forever entrapped. There are, however, practical schemes which make use of diffraction, diffusion, and imperfections in the crystal geometry whereby light may be inefficiently introduced into the crystal and assume a direction which is conducive to sufficient internal reflections such that the light is effectively entrapped. This is the obvious requirement of a maser amplifier. However, the purpose of this invention is best served by a crystal cavity which supports or contains the originating monochromatic light source. Such a source will be discussed hereinafter.

Figure 1:
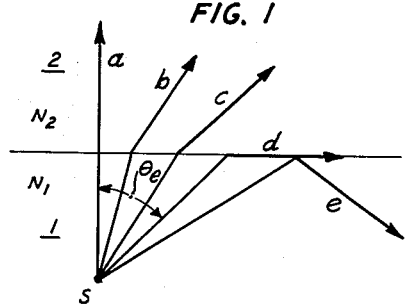
FIG. 1 is a schematic diagram of light rays of various angles incident to an interface between two media having different refractive indices.

In FIG. 1, there are shown five traveling light rays emanating from source S incident to an interface between mediums 1 and 2, medium 1 having a higher index of refraction. Elementary optical theory dictates that rays will be refracted into the second medium only up to a particular angle known as the critical angle, illustrated by the ray designated $d$. Beyond this angle, the light is essentially reflected (ray $e$). Using Snell's law, this critical angle can be related to the relative refractive indices as follows:

$$N_1 \sin \theta_1 = N_2 \sin \theta_2 \qquad (1)$$

where $N_1$ and $\theta_1$ are the refractive index and angle of incidence of the first medium and $N_2$ and $\theta_2$ are the refractive index and angle of refraction of the second medium. At the critical angle, $\theta_2$ becomes 90°. Assuming a value of 1 for $N_2$ (air) Equation 1 becomes:

$$\sin \theta_1 = \frac{1}{N_1} \qquad (2)$$

Figure 2:
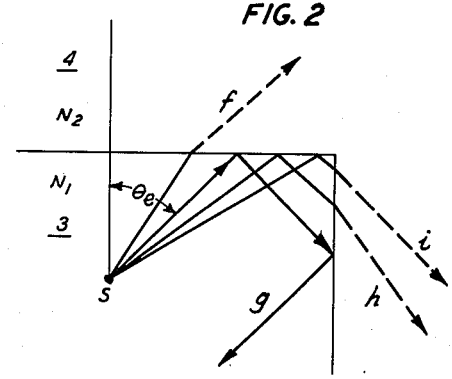
FIG. 2 is a similar diagram showing in two dimensions the principle of entrapped light.

Pursuing the theoretical explanation, FIG. 2 shows in two dimensions the condition for internal light entrapment for a single vertical plane of a box. Again, five traveling waves are shown emanating from source S toward the interface between 3 and 4, medium 3 having a higher index of refraction. Wave $f$ is refracted into medium 4 in a manner similar to waves $a$, $b$, and $c$ in FIG. 2. Wave $h$ meets the first surface or wall at an angle which is assumed to exceed the critical angle and is consequently reflected; however, as ray $h$ meets the second surface or wall it intersects at an angle less than the critical angle and thus escapes from the square. This same behavior is even more pronounced with the ray designated $i$. However, ray $g$, if we assume it to be incident at an angle approximating 45° and which we will also assume is reflected, will meet the second surface at necessarily the same angle, 45°, due to the geometry of the figure. It is now readily apparent that any ray incident to the first surface at 45° or less, which is reflected rather than transmitted, will never meet a subsequent face at an angle less than that of the first incidence. Therefore, considering only two dimensions in a square, the angle whereby total entrapment of light first begins to occur is $\theta_e$, which we will call the minimum entrapment angle, or 45° in this instance.

This minimum angle for entraping light may be related to the refractive index necessary to obtain this angle in a medium by using Equation 2:

$$\sin \theta = \frac{1}{n}$$

$$\frac{1}{n} = \sin 45°$$

$$= 1.414$$

It is apparent that for refractive indices greater than this value increasing amounts of light are entrapped. It is also apparent that while a point source S has been considered, this relation will be equally valid for every point in the two dimensional space.

Figure 3:
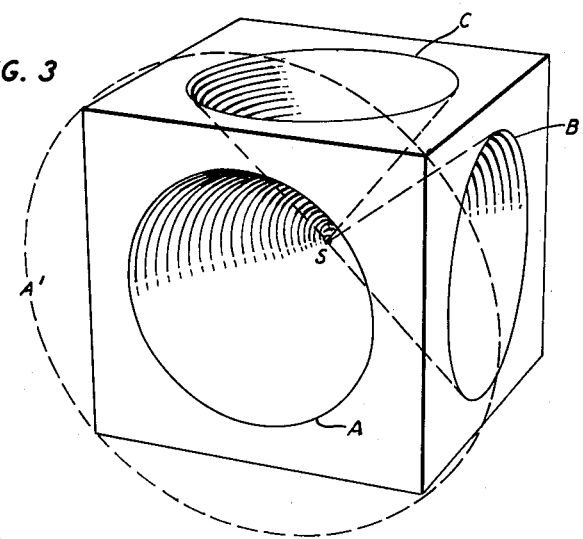
FIG. 3 is a diagrammatic view of a cubic crystal showing its refractive properties with respect to a geometrically centered point source of light.
Figure 5:
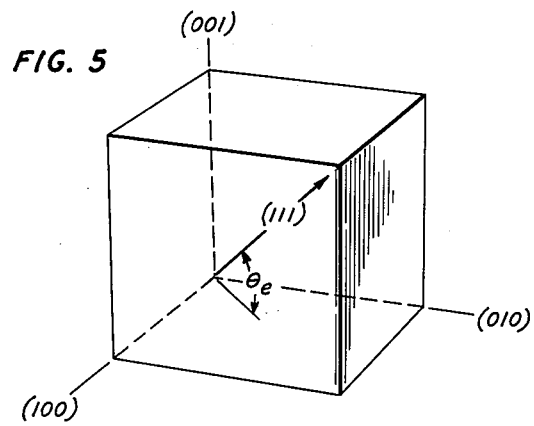
FIG. 5 is a perspective view of a solid cubic crystal structure according to this invention showing the crystallographic angle which relates the relative indices of refraction of the cube to the surrounding medium which will obtain the desired condition of total internal reflection of light.

If we extend this theory to practical geometries, i.e., to geometric solids in space, the same general principles hold true, however, they are somewhat more complex. FIG. 3 shows a typical geometric solid, in this instance, a cube, which with proper selection of refractive index will exhibit internal light entrapment. Consider first a point source of light geometrically centered in the solid. Light rays emanating therefrom may only escape the cube through the funnels A, B, and C (there being three additional escape funnels on the hidden faces). The conicity of the funnels is determined by the critical angle as in FIG. 1. The volume not encompassed by the cones represents directions in which rays from point source S will be internally reflected. It is characteristic of this geometric structure that all such rays will meet all subsequent faces at angles such that they will be reflected rather than refracted and will be forever trapped in that they will experience infinite internal reflections. As the size of the funnels increase, the circle A' is approached at which time the last remaining reflecting or entrapping surface or point will be the corners. This direction, which may be considered in a crystallographic sense as the (111) direction, is illustrated in FIG. 5 and corresponds to a minimum entrapment angle $\theta_e$, for a cube, whose sin is $\sqrt{2}/\sqrt{3}$. Relating this to the refractive index using Equation 2, the minimum refractive index to provide internal entrapment of light in a cube is 1.22.

Figure 4:
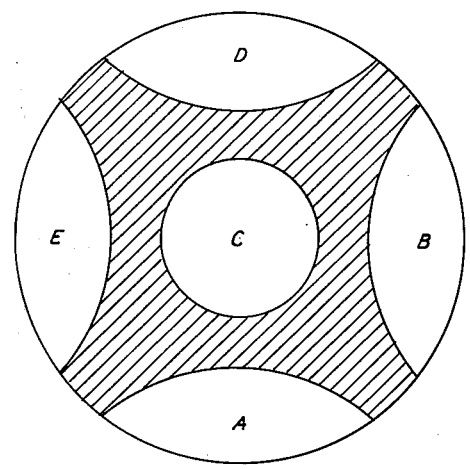
FIG. 4 is a graphic illustration of the possible ray paths for rays entrapped by total internal reflection within the cube of FIG. 3 showing every direction in space possible for a ray in the cube to assume and the relation of these directions to a particular refractive index of the cube.

A more refined illustration of the directions of light in a solid is shown in FIG. 4. This is a graphic illustration of the possible ray paths for rays entrapped by total internal reflection within the cube of FIG. 3 showing all directions in space associated with the cube. This requires only a showing of the top face and half of each side face. The funnels A, B, C, D, and E correspond to those of FIG. 3 but with the hidden faces of FIG. 3 now visible. While a point source S has been considered in connection with FIG. 3, FIG. 4 is a projection of all possible directions a light ray may assume while in the solid cube. Consequently, any ray having a direction falling within the shaded area of FIG. 4 will be entrapped. The extent of the shaded area is determined by the ratio of indices of refraction. It should be pointed out that the minimum entrapment angle $\theta_e$ which was derived with respect to a cube is likewise valid for a rectangular parallelepiped. However, other shapes may have different $\theta_e$ values. The $\theta_e$ for regular rectangular polyhedrons is dependent upon the number of sides and the relative dimensions. Materials having refractive indices providing critical angles in this range of minimum entrapment angles are easily obtained.

In the foregoing, it has been established that the crystal cavity must possess a particular geometric configuration and a critical refractive index with respect to the surrounding medium. The size of the crystal and the tolerable imperfections in the shape of the crystal present other essential features of the invention.

The number of modes of a given frequency of radiation which will be supported by a cavity is proportional to the size of the cavity. Ideally, the cavity should have dimensions which substantially match the wavelength of the radiation it supports. But, as stated previously, this consideration as applied to light frequency radiation is impractical. However, a cavity, if properly designed according to the teachings of the invention, may support many modes but one of these will dominate. To allow for mode selection, the cavity must be reasonably small since too many modes make selection impossible. A practical maximum dimension is set at 10 centimeters beyond which point the cavity is considered to support an excessive number of modes making proper mode selection problematical. There is no minimum limit since as one approaches the wavelength of light fewer modes are present in the cavity.

Although it is considered impractical to construct a cavity having dimensions commensurate with a wavelength, it is practical by presently available manufacturing techniques to fabricate a cavity having one such dimension. Accordingly, it is a further embodiment of this invention to reduce one of the three dimensions to within the range of one-half to three wavelengths. This, in terms of the visible spectrum, is a range of approximately .2 to 2 microns. The effect of this geometry is essentially a restriction of the mode propagation between the large parallel surfaces in a manner known to the art and more fully detailed in "Electromagnetic Theory" by S. A. Schelkunoff. This provides the significant advantage of essentially eliminating all the competing modes in other planes of the solid body which would otherwise criss-cross the preferred mode and reduce its efficiency. The shapes then of this embodiment are essentially thin layers either square, rectangular or circular. The circular layer, otherwise considered a cylinder having a very small height, is of interest in that it enables permanent entrapment of light for lower ratios of indices of refraction.

The geometric solids previously discussed were considered as ideal figures. However, the practical problems in optically manufacturing crystals of the requisite size necessitate certain departures from perfection that can be tolerated. The degree of polishing of the surfaces must be within two wavelengths and preferably within one wavelength. Each of the parallel sides (in all shapes except the sphere) must be parallel within two wavelengths divided by the dimension of the side, the resultant being in radians and should preferably be within one wavelength divided by the dimension of the side. The perpendicular angles should be perpendicular within the same degree. For a typical maser material emitting at 5000 A. the surface should be flat to within $1.10^{-4}$ cm. while the perpendicular angles should be correct within at least 3 minutes of an arc.

In a preferred embodiment of this invention, the crystal is utilized as a maser element. A device, operating by maser action in the light frequency range, is disclosed in U.S. Patent 2,929,922 issued March 22, 1960. According to the preferred embodiment of this invention, the crystal is composed of a material having the proper physical properties as defined above but further containing a negative temperature medium. This negative temperature medium is a material whose atomic or molecular structure provides three energy levels. To this material a pumping energy is supplied which translates electrons to the highest energy state thereby providing an unbalance in the equilibrium state of the atom. This electron population unbalance then tends to equalize and return to equilibrium with an attendant release of energy when electrons "fall" to the lower states. There are two mechanisms whereby the overpopulation can be equalized or relaxed. The atom can decay or spontaneously emit radiation to equalize the unbalanced or overpopulated levels. This random or spontaneous emission follows no oscillation pattern and consequently gives rise to noise, that is, radiation not in the preferred mode of coherent oscillation. The other mechanism whereby energy is released by the crystal is by stimulated emission whereby radiation of a selected frequency approximating the difference in energy levels of the negative temperature medium is applied to the medium stimulating the overpopulated higher level to emit radiation and return to the equilibrium condition. The emission which is stimulated occurs in the coherent oscillation pattern of the energy stimulating it, consequently, a coherent amplified radiation pattern results. If the stimulated emission or coherent emission prevails over the spontaneous emission or noise, then maser action is considered obtained.

As was previously pointed out, the internal entrapment of light in solid crystals requires generally that the source of radiation be within the crystal. The negative temperature medium according to this preferred embodiment provides such an internal source and will result in maximum reflections internally of the crystal. The retention in the crystal of coherent radiation for a maximum period will ensure the stimulation of a maximum of the atoms composing the negative temperature medium. The coherent radiation thus stimulated will eventually escape from the crystal through an edge, corner, or imperfection as previously set forth. Such a coherent source of electromagnetic energy can be modulated, amplified, and transmitted as an intelligent signal.

The negative temperature medium in a solid state device is a material commonly known as a phosphor. The phosphors in general commercial use do not possess sufficiently sharp bandwidths to be efficient in an optical or light radiation maser as just described. Consequently, materials have been developed which exhibit extremely narrow linewidths. Ruby has been found to be well adapted to light masers. Other of these materials form the subject for other inventions which are disclosed and claimed in copending applications of C. G. B. Garrett and W. K. Kaiser Serial No. 64,883, now Patent No. 3,079,347, and Serial No. 64,884, now abandoned, both filed October 25, 1960, and assigned to the assignee of the present case. Essentially they are $CaF_2$ host crystals doped with certain rare earths as activators and cerium as a sensitizer. A particular preferred composition for the negative temperature medium is $[.98\ Ca,\ .01\ Ce,\ .01\ Tb]\ F_2$. This material, when pumped, emits radiation efficiently at a frequency of 5500 Angstroms. The pumping energy is preferably ultraviolet light having a wavelength of 2000 to 3000 A.

Figure 6:
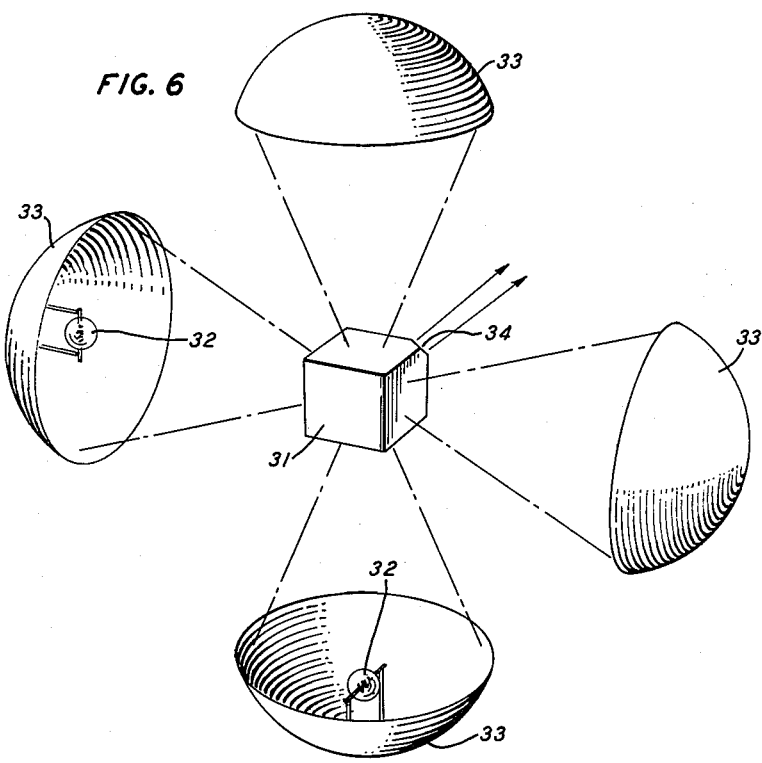
FIG. 6 is a schematic view of an apparatus employing maser action to provide a coherent light source.

A coherent optical generator using maser action according to this invention is shown in FIG. 6. Serving the function of the cavity is crystal 31 having the composition above described and a cubic geometry. The faces of the crystal are polished to within $5 \times 10^{-5}$ cm. The faces are perpendicular to within one minute of an arc. The crystal is pumped with radiation emitted from lamps 32 which are ultraviolet lamps having a compact arc of high pressure mercury. The ultraviolet light emitted from the lamps is focused on the crystal by spherical mirrors 33. The crystal is designed with imperfection 34 serving to emit the coherent light from the crystal as shown.

The crystal, during this operation, is preferably maintained in an atmosphere of liquid $N_2$ (that is, a temperature approximating 79° K.). The activator emits in a narrow linewidth at this reduced temperature. The monochromatic coherent light generated in this maser crystal has a wavelength of 5500 Angstroms. This coherent light may then be modulated, amplified, and transmitted.

The cavities described all have the advantage of entrapping light without the necessity of coated reflecting surfaces. This is significant in that the absence of silvered or coated surfaces permits the pump source, located outside the cavity, to have maximum access to the negative temperature medium inside the cavity. However, if one desires to utilize a mode pattern which is incident normal to a face, a reflecting coating is essential. If all faces are coated a greater degree of light will be retained than can be retained by a non-coated transparent cavity.

Accordingly, a further embodiment of this invention is a cavity having the geometry as above prescribed but further having all surfaces coated with highly reflecting coatings. Such a cavity, having all its surface coated, has been considered impractical by the art since coatings capable of reflecting rays in the interior of the cavity would excessively interfere with the pump source which directs light into the cavity from the exterior. The novel reflecting coatings proposed in this embodiment, however, serve the dual function of reflecting light having the frequency of the light inside the cavity while being sufficiently transparent to light having the frequency of the pump source. Consequently, a cavity having such a coating retains the radiation of the desired maser output while permitting the pump source to effectively activate the negative temperature medium. All the alkali metals possess this property of transmitting varying degrees of ultraviolet radiation (pump radiation) while reflecting radiation in various areas of the visible electromagnetic band. Accordingly, the coatings appropriate for this embodiment are layers of the alkali metals, Li, Na, K, Rb and Cs. These coatings may be applied in any of many techniques known in the art of producing silvered or reflecting metallic coatings, for instance, by vapor deposition. Appropriate thicknesses for the coatings are prescribed by the range $100-10^4$ Angstroms. Potassium is the preferred metal since its crossover point, that is, the point where it reflects rather than transmits is essentially in the wavelength area defining the separation between ultraviolet and visible light radiation.

Various other variations and modifications will become apparent to those skilled in the art, but such departures are considered within the scope of this invention and the appended claims.

What is claimed is:

1. A device for generating or amplifying coherent electromagnetic energy in the light frequency range which comprises a dielectric crystal body having the shape of a regular prism, said crystal body having its surfaces polished flat to within $10^{-4}$ cm., its perpendicular angles accurate to within 3 minutes of an arc, and having a maximum linear dimension of ten centimeters, said crystal body further consisting of a negative temperature medium the faces of which are essentially transparent to perpendicularly incident light, means associated with said crystal body for introducing light frequency pump radiation into the crystal, a medium surrounding said crystal which is transparent to the pump radiation and which has a refractive index as related to the refractive index of the crystal such that light within the crystal may be retained therein by internal reflections, and output means coupled with said cavity to extract coherent radiation from the cavity, said output means comprising a discontinuity in the dielectric surface.

2. The device of claim 1 wherein the negative temperature material is ruby.

3. The device of claim 1 wherein the negative temperature material is [.98 Ca, .01 Ce, .01 Tb] $F_2$.

4. The device of claim 1 wherein the crystal shape is essentially a cube and wherein the refractive index of the crystal is at least 1.414 times the refractive index of the surrounding medium.

5. The device of claim 1 wherein the crystal shape is essentially a rectangular parallelpiped.

6. The device of claim 1 wherein one dimension of said crystal is in the range .2 to 2 microns.

7. A device for generating or amplifying coherent electromagnetic energy in the light frequency range by stimulated emission of radiation which comprises a dielectric crystal body having the shape of a regular prism, said crystal body having its surfaces polished to within $10^{-4}$ cm., its perpendicular angles accurate to within 3 minutes of an arc and having a maximum linear dimension of 10 centimeters, said crystal body comprising a negative temperature medium which is essentially completely coated with a material which reflects the stimulated radiation but is essentially transparent to pumping radiation, said coating being approximately $100-10^4$ angstroms in thickness, means associated with said crystal body for introducing light frequency pump radiation into the crystal, and output means coupled with said cavity to extract coherent radiation from the cavity, said output means comprising a discontinuity in the dielectric surface.

8. The device of claim 7 wherein the said coating comprises a metal selected from the group consisting of sodium, potassium, lithium, rubidium and cesium.

9. A device for generating or amplifying coherent electromagnetic energy in the light frequency range which comprises a dielectric crystal body having the shape of a regular cylinder, said crystal body having its planar surfaces polished flat to within $10^{-4}$ cm., its perpendicular angles accurate to within 3 minutes of an arc, and having a maximum linear dimension of ten centimeters, said crystal body further consisting of a negative temperature medium the faces of which are essentially transparent to perpendicularly incident light, means associated with said crystal body for introducing light frequency pump radiation into the crystal, a medium surrounding said crystal which is transparent to the pump radiation and which has a refractive index as related to the refractive index of the crystal such that light within the crystal may be retained therein by internal reflections, and output means coupled with said cavity to extract coherent radiation from the cavity, said output means comprising a discontinuity in the dielectric surface.

10. A device for generating or amplifying coherent electromagnetic energy in the light frequency range by stimulated emission of radiation which comprises a dielectric crystal body having the shape of a regular cylinder, said crystal body having its planar surfaces polished flat to within $10^{-4}$ cm., its perpendicular angles accurate to within 3 minutes of an arc and having a maximum linear dimension of ten centimeters, said crystal body comprising a negative temperature medium which is essentially completely coated with a material which is capable of reflecting the stimulated radiation but is essentially transparent to the pump radiation, said coating being approximately $100-10^4$ angstroms in thickness, means associated with said crystal body for introducing light frequency pump radiation into the crystal, and output means coupled with said cavity to extract coherent radiation from the cavity, said output means comprising a discontinuity in the dielectric surface.

References Cited by the Examiner

UNITED STATES PATENTS

| 2,424,267 | 7/47 | Carter | 333—83 |
|---|---|---|---|
| 2,851,652 | 9/58 | Dickie. | |

OTHER REFERENCES

Alsop: "A Maser Amplifier for Radio Astronomy at X-Band," Proceedings of the IRE, Volume 47, No. 6, June 1959.

Geschwind et al.: "Optical Detection of Paramagnetic Resonance in an Excited State of $Cr^3$ in $Al_2O_3$," Physical Review Letters, Volume 3, No. 12, December 15, 1959, pages 545–548.

Maiman: "Optical and Microwave-Optical Experiments in Ruby," Physical Review Letters, Volume 4, No. 11, June 1, 1960, page 564.

Maiman: "Light Amplifier Extends Spectrum," Electronics, July 22, 1960.

Schawlow et al.: "Infrared and Optical Masers," Physical Review, Volume 112, No. 6, December 15, 1958, pages 1940–1949.

Theissing: "Optical Pumping in Crystals," Physical Review Letters, Volume 3, No. 10, November 15, 1959, pages 460–462.

JEWELL H. PEDERSEN, *Primary Examiner.*

EMIL S. ANDERSON, *Examiner.*